US011227630B2

(12) United States Patent
Teo et al.

(10) Patent No.: US 11,227,630 B2
(45) Date of Patent: Jan. 18, 2022

(54) SWAGE PLATE ASSEMBLY WITH SWAGE BOSS INSERT

(71) Applicant: Western Digital Technologies, Inc., San Jose, CA (US)

(72) Inventors: Kia Moh Teo, San Jose, CA (US); Yanning Liu, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 32 days.

(21) Appl. No.: 16/824,514

(22) Filed: Mar. 19, 2020

(65) Prior Publication Data

US 2021/0295864 A1 Sep. 23, 2021

(51) Int. Cl.
*G11B 5/48* (2006.01)

(52) U.S. Cl.
CPC .......... *G11B 5/486* (2013.01); *G11B 5/4826* (2013.01)

(58) Field of Classification Search
CPC .............................. G11B 5/486; G11B 5/4826
See application file for complete search history.

(56) References Cited

U.S. PATENT DOCUMENTS

| | | | | |
|---|---|---|---|---|
| 5,172,286 A * | 12/1992 | Jurgenson | ............ | G11B 5/5521 360/244.6 |
| 5,262,911 A * | 11/1993 | Cain | ............ | G11B 5/5521 29/603.03 |
| 5,570,249 A * | 10/1996 | Aoyagi | ............ | G11B 5/4833 360/244.2 |
| 5,579,190 A * | 11/1996 | Mastache | ............ | G11B 21/081 360/265.6 |
| 5,689,389 A * | 11/1997 | Braunheim | ............ | G11B 21/16 360/244.6 |
| 5,717,545 A * | 2/1998 | Brooks, Jr. | ............ | B21K 23/04 29/523 |
| 5,812,343 A * | 9/1998 | Budde | ............ | G11B 21/16 360/244.6 |
| 5,877,919 A * | 3/1999 | Foisy | ............ | G11B 5/4826 360/244.6 |

(Continued)

FOREIGN PATENT DOCUMENTS

EP 0438806 A2 7/1991

OTHER PUBLICATIONS

Bamrungwongtaree, Joompondej et al., Improvement of Boss Tower for Single Ball Swaging in Hard Disk Drive, International Journal of Scientific and Research Publications, Nov. 2012, pp. 1-9, vol. 2, Issue 11, jsrp.org, downloaded from http://www.ijsrp.org/research-paper-1112/ijsrp-p1129.pdf.

*Primary Examiner* — Brian E Miller
(74) *Attorney, Agent, or Firm* — John D. Henkhaus (57) ABSTRACT

An approach to a head gimbal assembly (HGA), such as for a hard disk drive, includes a swage plate assembly coupling a suspension to one side of an actuator arm, where the swage plate assembly includes a baseplate having a through-hole and a swage boss insert comprising a flange and a swage boss extending from the flange through the baseplate through-hole. The HGA is configured such that the baseplate is positioned between the flange and the actuator arm, such that a distal surface of the flange is the surface closest to a corresponding recording medium, whereby the thickness of the suspension is effectively recessed within the material dimensional buildup of the other parts and a greater clearance is provided between the suspension and the recording medium.

19 Claims, 8 Drawing Sheets

(56) References Cited

U.S. PATENT DOCUMENTS

| | | | |
|---|---|---|---|
| 5,896,646 A * | 4/1999 | Boutaghou | G11B 5/4813 29/603.01 |
| 5,973,885 A | 10/1999 | Hanrahan et al. | |
| 6,046,885 A * | 4/2000 | Aimonetti | G11B 5/4833 360/244.6 |
| 6,230,959 B1 * | 5/2001 | Heist | G11B 5/4813 228/101 |
| 6,469,869 B1 * | 10/2002 | Vera | G11B 5/4813 360/244.5 |
| 6,597,538 B1 * | 7/2003 | Kashima | G11B 5/4813 360/244.5 |
| 6,754,044 B1 * | 6/2004 | Braunheim | G11B 5/4826 360/244.5 |
| 6,768,612 B2 * | 7/2004 | Hanya | G11B 5/486 360/244.8 |
| 6,940,696 B2 * | 9/2005 | Takagi | G11B 5/4826 360/244.6 |
| 6,958,890 B1 * | 10/2005 | Lin | G11B 5/4826 360/244.6 |
| 7,130,156 B1 | 10/2006 | Fossum | |
| 7,324,307 B2 * | 1/2008 | Brink | G11B 5/4813 360/244.6 |
| 7,502,204 B2 * | 3/2009 | White | G11B 5/4833 360/244.5 |
| 7,663,841 B2 * | 2/2010 | Budde | G11B 5/5552 360/244.5 |
| 8,233,239 B1 * | 7/2012 | Teo | G11B 5/4813 360/244.6 |
| 8,254,062 B2 * | 8/2012 | Greminger | G11B 5/4813 360/244.5 |
| 8,780,504 B1 * | 7/2014 | Teo | G11B 5/4873 360/294.4 |
| 8,797,689 B1 * | 8/2014 | Pan | G11B 5/4833 360/294.4 |
| 8,804,286 B1 * | 8/2014 | Aparimarn | G11B 5/4813 360/244.6 |
| 9,070,391 B1 * | 6/2015 | Berscheit | G11B 5/4813 |
| 9,502,057 B1 | 11/2016 | Schrieber et al. | |
| 2006/0023363 A1 | 2/2006 | Hanrahan et al. | |

* cited by examiner

Prior Art

FIG. 1

Prior Art

FIG. 2A

Prior Art

SWAGE A FIRST SUSPENSION TO A FIRST SIDE OF AN ACTUATOR ARM VIA A SWAGE BOSS OF A FIRST SWAGE PLATE ASSEMBLY, THE FIRST SWAGE PLATE ASSEMBLY COMPRISING: A BASEPLATE COMPRISING A THROUGH-HOLE, AND A SWAGE NUT COMPRISING A FLANGE AND THE SWAGE BOSS EXTENDING FROM THE FLANGE THROUGH THE THROUGH-HOLE OF THE BASEPLATE;
WHEREIN:

(A) THE BASEPLATE IS POSITIONED BETWEEN THE FLANGE AND THE FIRST SIDE OF THE ACTUATOR ARM;

(B) THE FIRST SUSPENSION COMPRISES AN ELECTRICAL TRACE ROUTED ALONG A LONG AXIS AND ON A TRACE SIDE OF THE FIRST SUSPENSION; AND (C) THE SWAGE NUT IS COUPLED WITH THE BASEPLATE ON THE TRACE SIDE OF THE FIRST SUSPENSION

SWAGE PLATE ASSEMBLY WITH SWAGE BOSS INSERT

FIELD OF EMBODIMENTS

Embodiments of the invention may relate generally to a swaging part and particularly to a swage boss insert to a baseplate such as for swaging a stacked assembly.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patter s of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a slider that houses the read-write transducer (or "head"), and a suspension. Each slider is attached to the free end of a suspension that in turn is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure that carries the slider and its read-write head. Positioned between the mount plate and the functional end of the load beam is a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll in order to adjust its orientation.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DESCRIPTION

Approaches to a swage boss insert to a baseplate stiffener are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a swaged stacked assembly, such as a head gimbal assembly (HGA) for a hard disk drive (HDD). Thus, in accordance with an embodiment, a plan view illustrating a conventional HDD 100 is shown in FIG. 1 to aid in describing how a conventional HDD typically functions.

Figure 1:
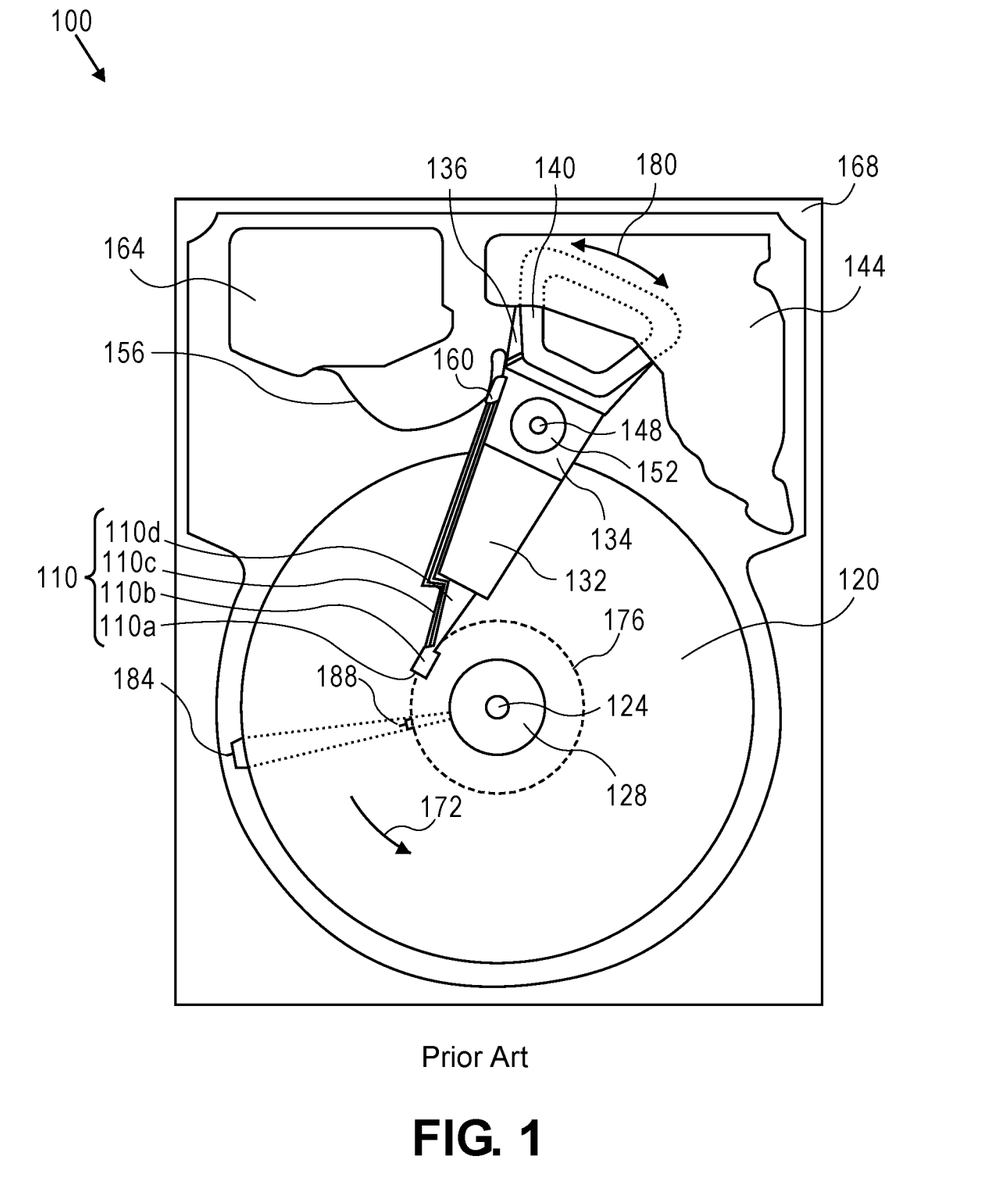
FIG. 1 is a plan view illustrating a hard disk drive, according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM, or "voice coil actuator") that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM, and a write signal to and a read signal from the head 110a) are transmitted by a flexible cable assembly (FCA) 156 (or "flex cable"), also at times referred to as a flexible printed circuit (FPC). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium or hydrogen for non-limiting examples, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Increasing the storage capacity of hard disk drives (HDDs) is one of the on-going goals of HDD technology evolution. In one form, this goal manifests in increasing the number of disks implemented in a given HDD. However, oftentimes the customer demand requires maintaining a standard form factor, as characterized in part by the z-height of an HDD, which inherently provides challenges with respect to fitting more disks into a given HDD. More particularly, customer specifications and/or common design and operational constraints include operational shock (or "op-shock") requirements, which generally relate to an HDD's operational resistance to or operational tolerance of a mechanical shock event. Recall that the suspension of an HDD typically includes a relatively stiff load beam with a mount plate at its base end, which attaches to the actuator arm, and whose free end mounts a flexure that carries the slider and its read-write head. Thus, it remains a challenge to increase the number of disks while maintaining a standard form factor, which decreases the distance between each disk of the disk stack, while also reliably meeting op-shock requirements. In particular, the limited mechanical clearances associated with the head gimbal assembly (HGA), such as relative to the operational positioning of each suspension as interposed with the disks within the disk stack, pose a challenge to meeting such requirements. Stated otherwise, the less spacing between disks may logically result in lower op-shock performance in the context of a typically configured HGA.

Figure 2A:
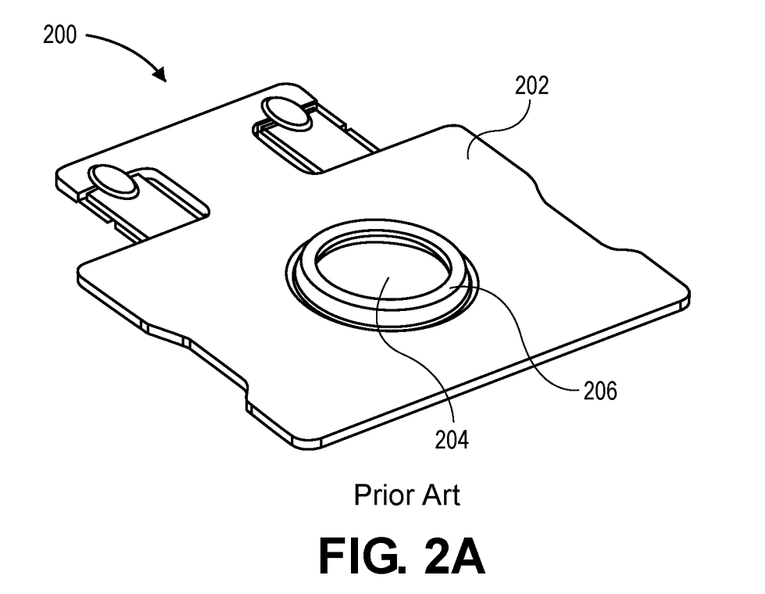
FIG. 2A is a perspective view illustrating a swage plate.
Figure 2B:
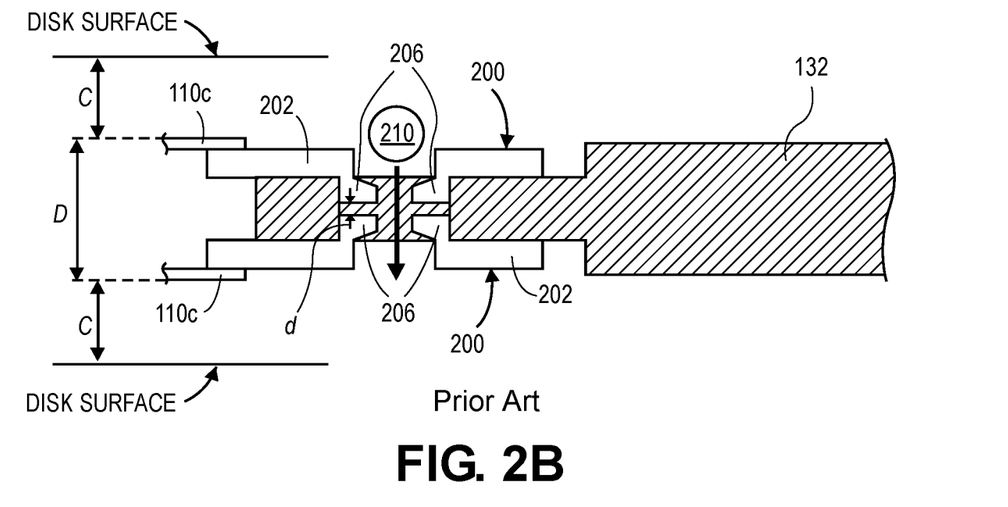
FIG. 2B is a cross-sectional side view illustrating a swaged suspension-arm assembly utilizing the swage plate of FIG. 2A.

FIG. 2A is a perspective view illustrating a swage plate, and FIG. 2B is a cross-sectional side view illustrating a swaged suspension-arm assembly utilizing the swage plate of FIG. 2A. Swage plate 200 illustrates what may be considered a typical swage plate used for coupling an HDD suspension to a corresponding actuator arm. Swage plate 200 comprises a main body 202 comprising a swage through-hole 204 therethrough, which is surrounded at its perimeter by a swage boss 206. Typically, the swage plate 200 would have a suspension (such as lead suspension 110c of FIG. 1) welded or otherwise mechanically coupled thereto (as well as electrically coupled thereto), prior to the swaging (or swage-coupling) of the suspension to a corresponding actuator arm (such as arm 132 of FIG. 1). Swaging is a well-known forging process typically enacted by forcing a swage ball 210 through the through-hole 204 to deform or alter the dimensions of the swage boss 206 (e.g., rotary swaging), to cold work the metals to form a bond or inter-coupling of the swage plate 200/suspension 110c subcomponent and the arm 132 subcomponent. That is, the swage boss 206 is inserted into an aperture in the actuator arm 132 and a swage ball 210, which has a larger diameter than the inner diameter of the swage boss 206, is inserted into the swage through-hole 204 of the swage boss 206 to swage couple the swage boss 206 to the aperture by applying a compressive force to the inner surface of the swage boss 206 such that the swage boss 206 expands to hold the actuator arm to the suspension.

As can be appreciated by the illustration of FIG. 2B, the distance (D) from the outer surface of the "up" suspension (e.g., the lower suspension 110c which interacts with the top or "up" surface of a corresponding disk) and the "down" suspension (e.g., the upper suspension 110c which interacts with the bottom or "down" surface of a corresponding disk) is a driving dimension in regards to the amount of dimensional clearance (C) afforded between each suspension 110c and a corresponding disk surface on which the corresponding read-write transducer operates. This clearance C, therefore, would affect the likelihood that either of the HGAs (or constituent subcomponents) might mechanically interact with (e.g., "hit") its corresponding disk surface consequent to a shock event, which could likewise affect the overall op-shock performance of the HDD. In view of the foregoing and the goal of increasing the number of recording disks in a disk stack, an approach to reducing the distance D between the pair of suspensions swaged to a given actuator arm, while maintaining the necessary clearance C with corresponding disk surfaces, may be desirable.

Approaches to the foregoing space issue may include reducing the arm tip thickness within the constraint allowed by the swage boss buildup, reducing the overall thickness of the stamped swage plate part (but this could likely lead to easy bending due to the lower yield strength post-annealing), reducing the swage boss tower height, and reducing the thickness of the media to allow greater clearance between the media and arm mounting surfaces.

Swage Boss Insert for Reducing Material Dimensional Buildup

Figure 3A:
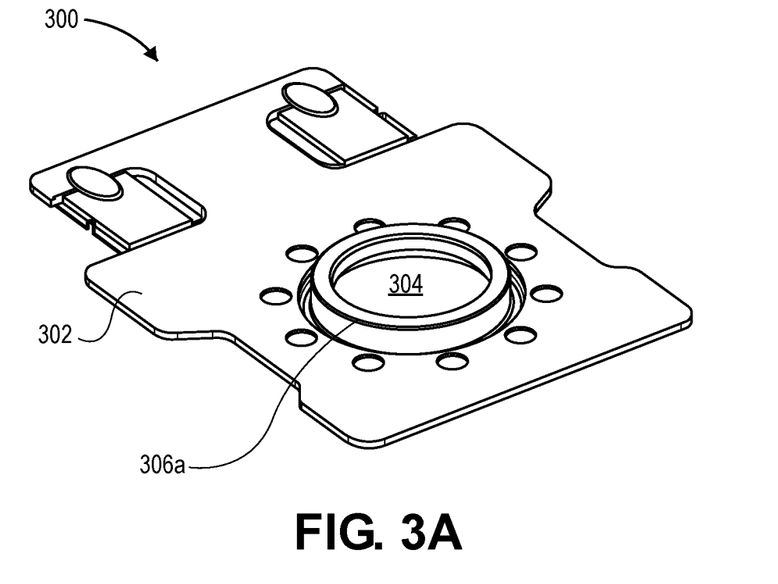
FIG. 3A is a "top" perspective view illustrating a swage plate assembly, according to an embodiment.
Figure 3B:
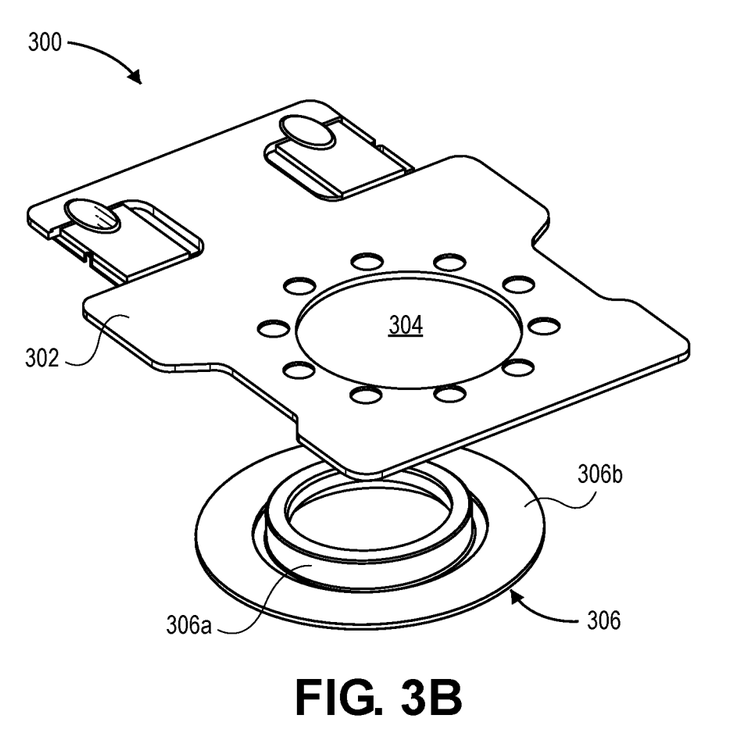
FIG. 3B is an exploded "top" perspective view illustrating the swage plate assembly of FIG. 3A, according to an embodiment.
Figure 3C:
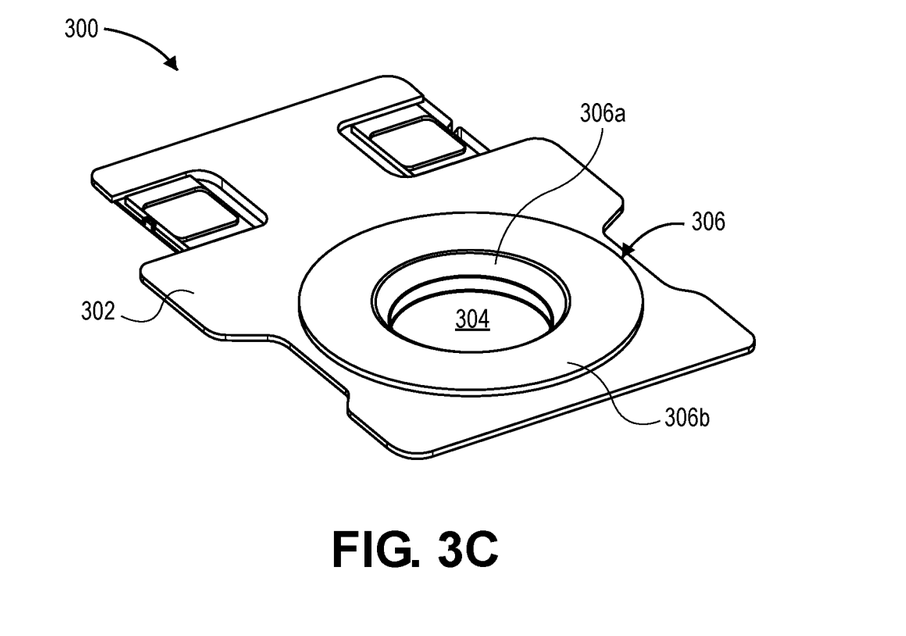
FIG. 3C is a "bottom" perspective view illustrating the swage plate assembly of FIG. 3A, according to an embodiment.
Figure 3D:
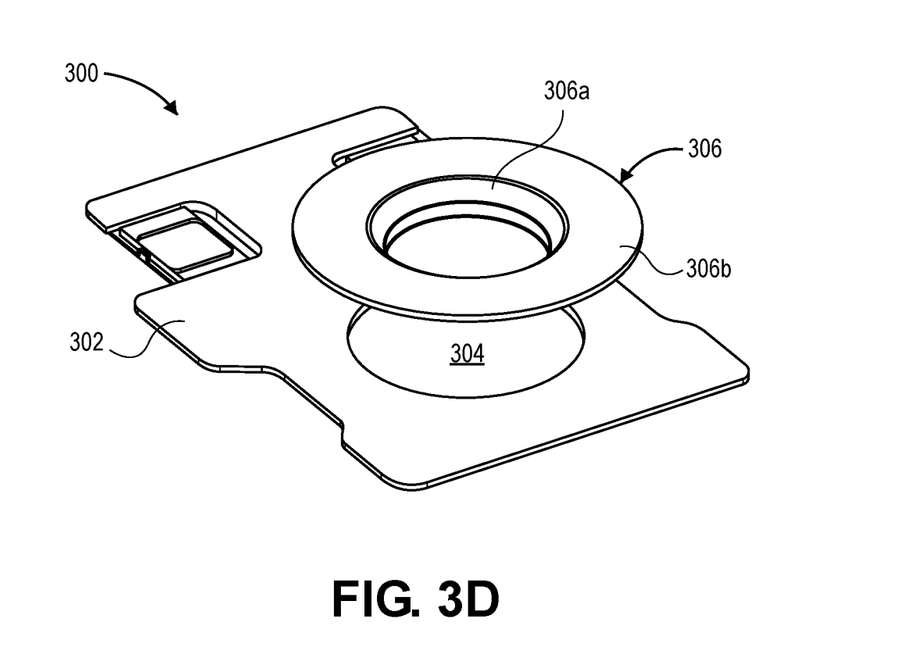
FIG. 3D is an exploded "bottom" perspective view illustrating the swage plate assembly of FIG. 3A, according to an embodiment.

FIG. 3A is a "top" perspective view illustrating a swage plate assembly, FIG. 3B is an exploded "top" perspective view illustrating the swage plate assembly of FIG. 3A, FIG. 3C is a "bottom" perspective view illustrating the swage plate assembly of FIG. 3A, and FIG. 3D is an exploded "bottom" perspective view illustrating the swage plate assembly of FIG. 3A, all according to an embodiment. Swage plate assembly 300 can be used for coupling an HDD suspension to a corresponding actuator arm, according to an embodiment. Swage plate assembly 300 (or simply "swage plate 300") comprises a planar baseplate (or "stiffener") 302 comprising a first swage through-hole 304 (or simply "through-hole") through the baseplate 302, and through which is inserted a swage boss (or "boss tower") 306a portion of a swage boss insert 306 that extends substantially normal to a flange 306b portion of the swage boss insert 306. An implementation of a swage plate assembly 300 may have a suspension (such as lead suspension 110c of FIG. 1) welded or otherwise mechanically coupled thereto (as well as electrically coupled thereto), prior to the swaging (or swage-coupling) of the suspension to a corresponding actuator arm (such as arm 132 of FIG. 1). As discussed in reference to FIG. 2A, swaging is a well-known forging process typically enacted by forcing a swage ball through the through-hole 304 to deform or alter the dimensions of the swage boss 306a to cold work the metals to form a bond or inter-coupling of the swage plate assembly 300/suspension subcomponent (such as suspension assembly 400 of FIGS. 4A-4C) and the arm subcomponent.

Figure 4A:
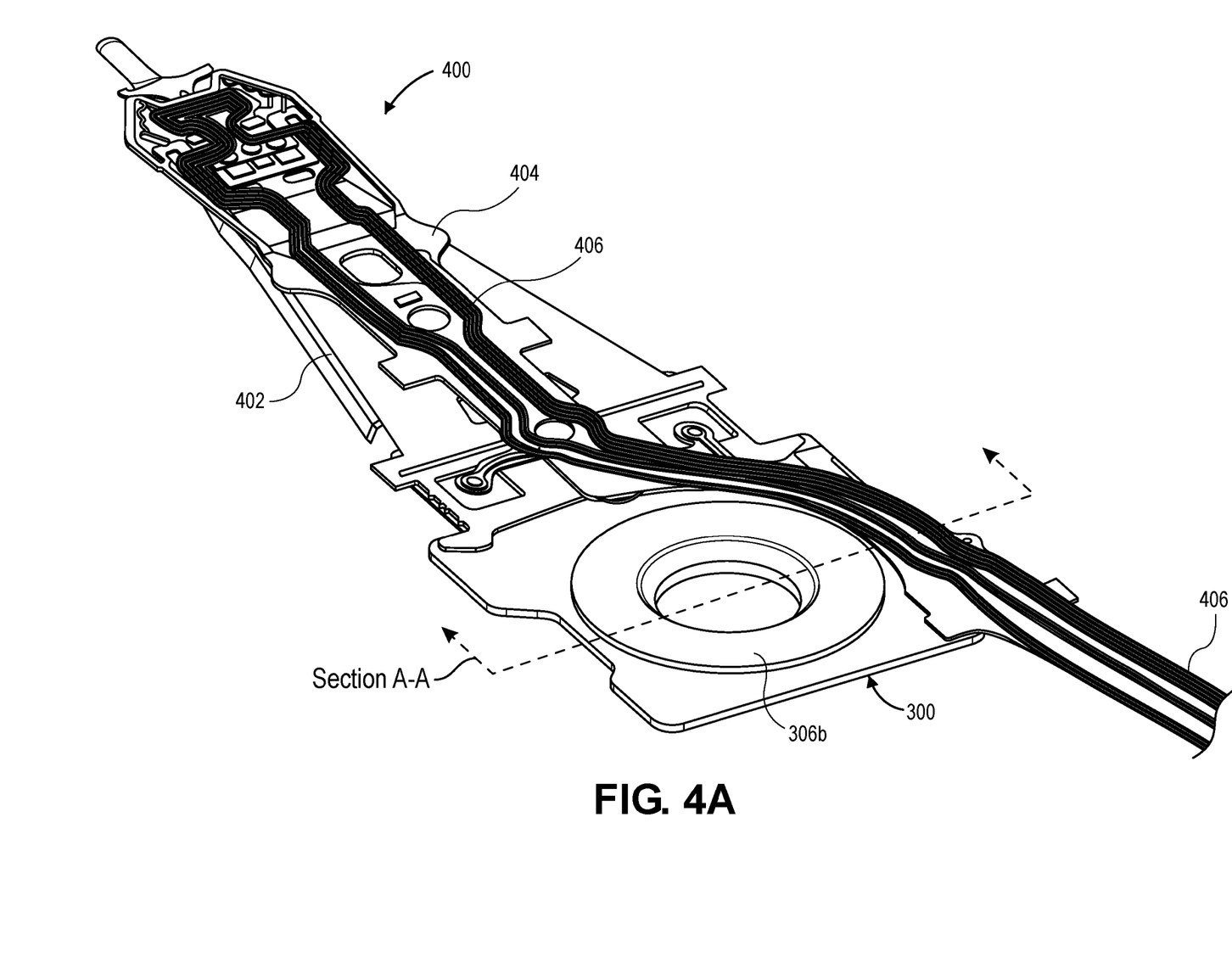
FIG. 4A is a "bottom" perspective view illustrating a suspension assembly, according to an embodiment.
Figure 4B:
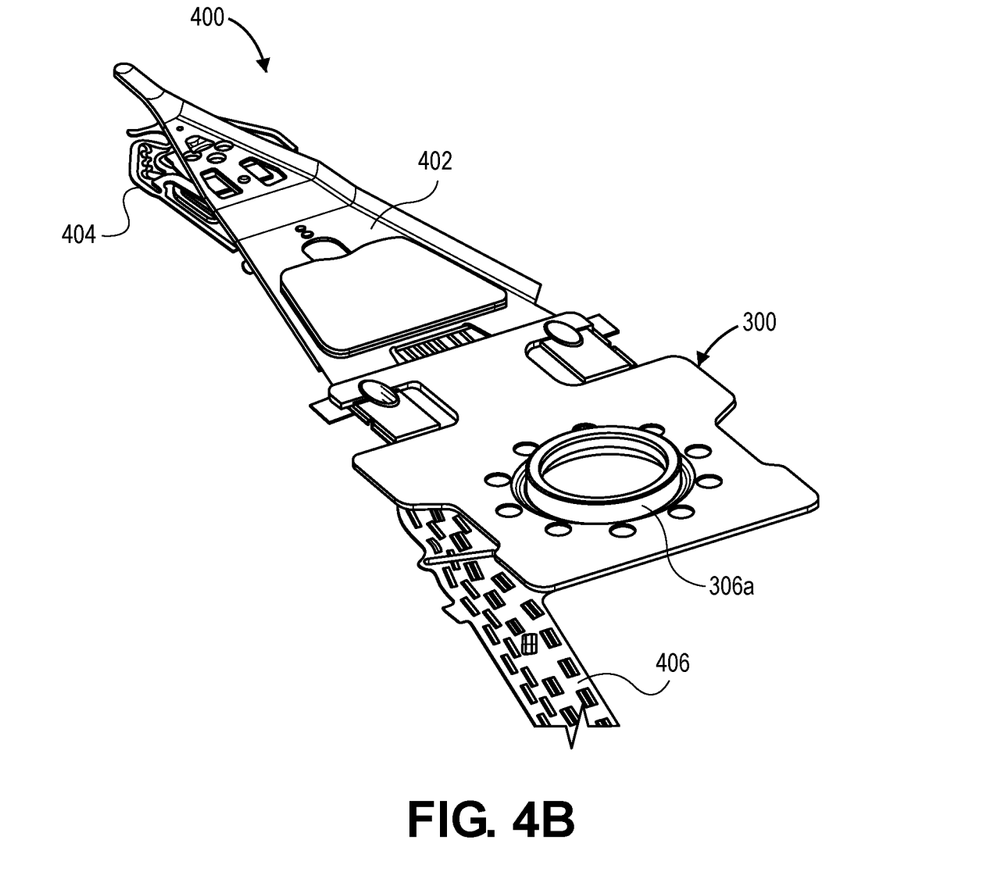
FIG. 4B is a "top" perspective view illustrating a suspension assembly of FIG. 4B, according to an embodiment.
Figure 4C:
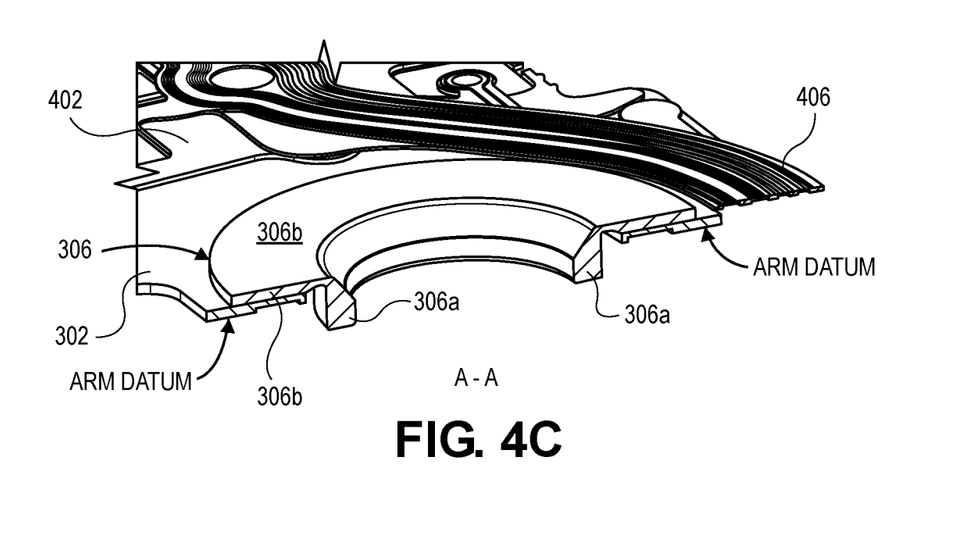
FIG. 4C is a cross-sectional perspective view illustrating the suspension assembly of FIG. 4A, according to an embodiment.

FIG. 4A is a "bottom" perspective view illustrating a suspension assembly, FIG. 4B is a "top" perspective view illustrating the suspension assembly of FIG. 4A, and FIG. 4C is a cross-sectional perspective view illustrating the suspension assembly of FIG. 4A, all according to an embodiment. Suspension assembly 400 utilizes the swage plate assembly 300 of FIGS. 3A-3D, according to an embodiment. Suspension assembly 400 comprises a load beam 402, a flexure 404 gimbally coupled with the load beam 402 and housing a read-write transducer (such as read-write head 110a of FIG. 1), and an electrical trace (or "lead") 406 routed along the long axis and on a "trace side" of the load beam 402 to electrically connect the read-write head to other HDD electronic components (e.g., a pre-amp, channel electronics, etc.).

Note that with the implementation of a swage assembly such as swage plate assembly 300 for use in swaging together a head gimbal assembly (HGA) for a hard disk drive (HDD), a separate thinner structural piece can be used for the mounting datum (i.e., the mating member with the arm tip), in the form of the baseplate 302, with a separate small swage boss insert 306 piece. The separate thin baseplate 302 may be formed from stainless steel with an etching process, similar to how the load beam 402 is typically formed, or may be formed from a different material altogether, such as for structural stiffness or mass reasons. In the scenario in which the baseplate 302 is not made using the typical stamping process, the baseplate 302 material does not need to be heat treated as is typically required for a conventional swage baseplate piece and, therefore, could have a higher yield strength that would not undesirably deform as readily. Furthermore, here, with etching versus stamping, the baseplate 302 can be made just as thin but without or with less concern about maintaining the planarity or flatness of the part. Likewise, the swage boss insert part 306 is small and the planarity or flatness concern is minimal to non-existent.

According to an embodiment, the swage boss insert 306 is attached to the baseplate 302 from the flexure trace side, the significance of which is described in more detail elsewhere herein. If the swage boss insert 306 is weld attached to the baseplate, then the welding could be from either side of the baseplate 302. Alternatively, the swage boss insert 306 and the baseplate 302 can be formed as one unitary integral part.

With a thinned down or recessed section on the baseplate 302 where the load beam 402/flexure 404 assembly is attached, the load beam 402 and flexure 404 thickness can be formed and configured so as not to contribute to the total thickness of the suspension assembly 400 at the baseplate 302 area of the swage plate assembly 300. Hence, there is no suspension-to-media clearance loss due to the load beam 402 and/or flexure 404 thicknesses, including the electrical trace 406, after the suspension assembly 400 is installed inside an HDD, which is illustrated in more detail in the context of FIG. 5. With reference to section A-A of FIG. 4C, note that the order of component material dimensional buildup (from the top-down in the context of FIG. 4C) is such that the flange 306b (of the swage boss insert 306) is followed by the baseplate 302, which is followed by the actuator arm (not shown here for clarity purposes, arm datum shown), in contrast to known suspension assemblies.

Figure 5:
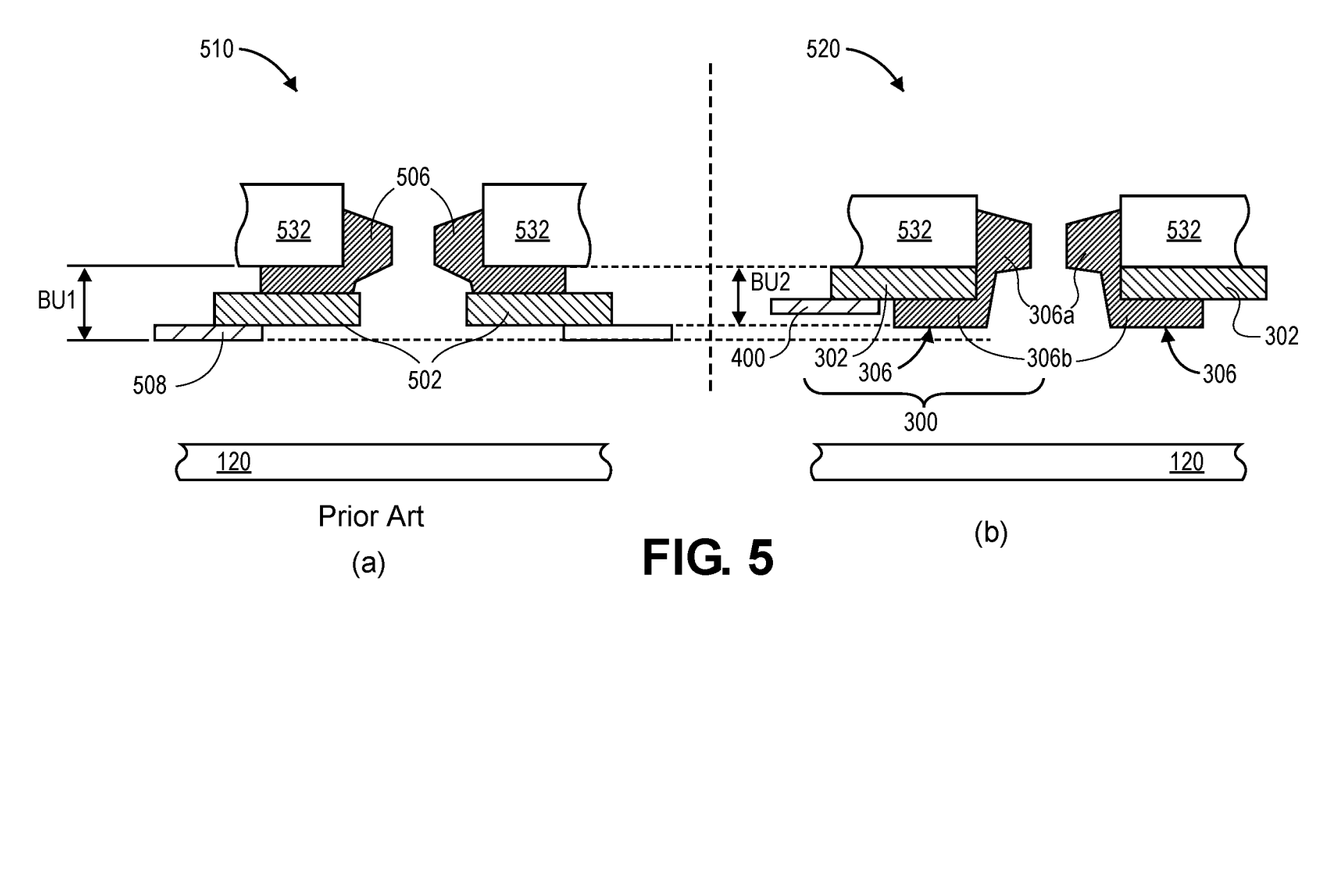
FIG. 5 is a cross-sectional side view illustrating a dimensional comparison of two different suspension-arm assembly swage-couplings, according to an embodiment.

FIG. 5 is a cross-sectional side view illustrating a dimensional comparison of two different suspension-arm assembly swage-couplings, according to an embodiment. A typical suspension-arm assembly 510 (left-hand side, denoted as part (a) of FIG. 5) may comprise an arm 532 (or "actuator arm", such as arm 132 of FIG. 1), to which a suspension assembly 508 is coupled via a swage boss 506 coupled with a swage baseplate (or "stiffener") 502. Thus, the component material buildup ("BU1"), between the arm 532 and the bottom of the suspension assembly 508 (most distal surface) is as illustrated, whereby the arm side of the suspension-arm assembly 510 is herein considered "proximal" and the buildup of component material moving toward/to the suspension assembly 508 is considered the "distal" direction. By contrast, and according to an embodiment, suspension-arm assembly 520 (right-hand side, denoted as part (b) of FIG. 5) comprises the arm 532, to which a first suspension assembly 400 is coupled to a first side via the swage plate assembly 300 comprising the swage boss insert 306 coupled with a swage baseplate (or "stiffener") 302, where the swage boss insert 306 comprises the swage boss 306a coupled with the flange 306b. Thus, the component material buildup ("BU2"), between the arm 532 and the bottom of the swage boss insert 306 (most distal surface) is as illustrated. As illustrated in FIG. 5, BU2 is less than BU1, thereby providing more clearance between the suspension assembly 400 and the corresponding recording disk 120 surface (see, e.g., clearance C of FIG. 2B).

Similarly, a second suspension assembly 400 may be coupled to a second side of the arm 532 via a swage plate assembly 300 comprising the swage boss insert 306 coupled with a swage baseplate 302, where the swage boss insert 306 again comprises the swage boss 306a coupled with the flange 306b, and where which suspension assembly and suspension-arm assembly is referred to as the "first" and the "second" is arbitrary. Regardless, the effect on the component material buildup ("BU2") with respect to the second suspension-arm assembly is as with the first suspension-arm assembly 520, where BU2 is less than BU1 and more clearance is provided between the suspension assembly 400 and the corresponding recording disk surface.

According to an embodiment, and as illustrated in FIG. 5 (and FIGS. 4B, 4C), the proximal surface of the flange 306b and the proximal surface of the suspension assembly 400 are both mated with the same distal surface of the baseplate 302 of the swage plate assembly 300. Thus, to reiterate the foregoing material dimensional buildup relationship, the distal surface of the flange 306b of the swage plate assembly 300 is a first distance from the distal surface of the baseplate 302 and the distal surface of the suspension assembly 400 is a second distance from the distal surface of the baseplate 302, and the first distance is greater than the second distance. That is, the most distal surface of the swage plate assembly 300 extends farther from the arm 532 than the most distal surface of the suspension assembly 400 (including the load beam 402, flexure 404, and electrical trace 406) extends from the arm 532, such that the most distal surface of the swage plate assembly 300, i.e., the distal surface of the flange 306b, is the closest surface to the recording medium 120. Therefore, the thickness of the suspension assembly 400 is effectively eliminated from or subsumed by the totality of the material dimensional buildup, and a greater material dimensional clearance is provided between the suspension assembly 400 and the recording medium 120, e.g., the disk surface. Furthermore, the area of the suspension assembly 400 and the recording medium 120 at which the surface distances are described is considered to be an area that is prone to undesirable component contact in response to an operational shock event.

In view of the foregoing, with the attachment portion of the suspension assembly being effectively "recessed" within the z-height footprint of the swage plate assembly, an optimized or an increased recording disk clearance configuration is provided, such that the corresponding recording disks can be positioned closer together and still meet op-shock requirements. Therefore, more disks can be installed onto the disk spindle (e.g., spindle 124 of FIG. 1) of an HDD of a given z-height, such as within a standard form factor HDD.

Method of Assembling a Head Gimbal Assembly

Figure 6:
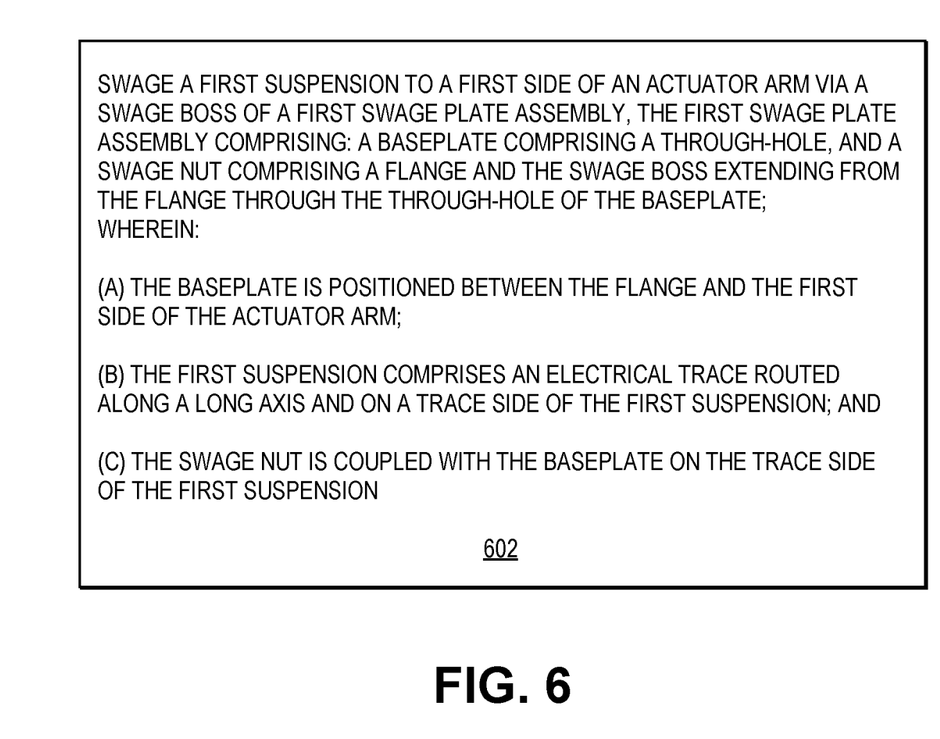
FIG. 6 is a flow diagram illustrating a method of assembling a head gimbal assembly, according to an embodiment.

FIG. 6 is a flow diagram illustrating a method of assembling a head gimbal assembly, according to an embodiment.

At block 602, swage-couple (or simply, swage) a first suspension to a first side of an actuator arm via a swage boss of a first swage plate assembly, where the first swage plate assembly comprises a baseplate comprising a through-hole and a swage nut (or "swage boss insert") comprising a flange, and with the swage boss extending from the flange through the baseplate through-hole. For example, the suspension assembly 400 (e.g., FIGS. 4A, 4B, 5) is swaged to the bottom side of an arm tip of the actuator arm 532 (FIG. 5) via swage boss 306a (FIGS. 3A-3D, 4B, 4C, 5) of the first swage plate assembly 300 (FIGS. 3A-3D, 4A, 4B, 5), where the first swage plate 300 comprises (a) a baseplate 302 (see, e.g., FIGS. 3A-3D) comprising a through-hole 304 (see, e.g., FIGS. 3A-3D) and a swage boss insert 306 (see, e.g., FIGS. 3A-3D) comprising a flange 306b, and with the swage boss 306a extending from the flange 306b through the through-hole 304 of the baseplate 302.

Further with respect to block 602, the swaged configuration is such that the baseplate is positioned between the flange and the first side of the actuator arm, the first suspension comprises an electrical trace routed along a long axis and on a trace side of the first suspension, and the swage nut is coupled with the baseplate on the trace side of the first suspension. For example, the baseplate 302 is positioned between the flange 306b and the first side of the actuator arm 532, the first suspension assembly 400 comprises an electrical trace 406 (FIGS. 4A-4C) routed along a long axis and on a trace side of the first suspension assembly 400, and the swage boss insert 306 is coupled with the baseplate 302 on the trace side (see, e.g., FIGS. 4A, 4C) of the first suspension assembly 400.

Thus, a relatively thin suspension-arm assembly design is enabled with minimal structural material dimensional buildup, and a reduced height suspension-arm assembly of an HGA is produced, thereby increasing the overall space clearance between the HGA and the recording disk medium and inhibiting a detrimental operational shock event.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head stack assembly (HSA) comprising:
an arm;
a first suspension assembly comprising a load beam and a flexure; and
a first swage plate assembly to which the first suspension assembly is coupled, the first swage plate assembly coupling the first suspension assembly to a first side of the arm and comprising:
a baseplate comprising a through-hole, and
a swage boss insert comprising a flange and a swage boss extending from the flange through the through-hole of the baseplate;
wherein:
the baseplate is positioned between the flange and the first side of the arm; and
a proximal surface of the flange and a proximal surface of the first suspension assembly both mate with a same distal surface of the baseplate.

2. The HSA of claim 1, wherein:
a distal surface of the flange is a first distance in a distal direction from the distal surface of the baseplate;
a distal surface of the first suspension assembly is a second distance in the distal direction from the distal surface of the baseplate; and
the first distance is greater than the second distance.

3. The HSA of claim 1, wherein:
the first suspension assembly further comprises an electrical trace routed along a long axis and on a trace side of the first suspension assembly; and
the swage boss insert is coupled with the baseplate, via the flange, on the trace side of the first suspension assembly.

4. The HSA of claim 1, wherein the swage boss insert is welded to the baseplate.

5. The HSA of claim 1, wherein the swage boss insert and the baseplate are formed together as a unitary part.

6. The HSA of claim 1, further comprising:
a second suspension assembly; and
a second swage plate assembly to which the second suspension assembly is coupled, the second swage plate assembly coupling the second suspension assembly to an opposing second side of the arm and comprising:
a baseplate comprising a through-hole, and
a swage boss insert comprising a flange and a swage boss extending from the flange through the through-hole of the baseplate;
wherein the baseplate of the second swage plate assembly is positioned between the flange of the swage boss insert of the second swage plate assembly and the second side of the arm.

7. The HSA of claim 6, wherein:
the second suspension assembly further comprises an electrical trace routed along a long axis and on a trace side of the second suspension assembly; and for the second swage plate assembly, the swage boss insert is coupled with the baseplate, via the flange, on the trace side of the second suspension assembly.

8. A hard disk drive (HDD) comprising:
a plurality of recording disk media rotatably mounted on a spindle;
a first head slider housing a first read-write transducer configured to read from and to write to a first recording disk medium of the plurality of recording disk media;
a voice coil actuator configured to move the first head slider to access portions of the first recording disk medium; and
a head stack assembly (HSA) coupled with the voice coil actuator, the HSA comprising:
an actuator arm,
a first suspension; and
a first swage plate assembly to which the first suspension is coupled, the first swage plate assembly coupling the first suspension to a first side of the actuator arm and comprising:
a stiffener comprising a through-hole, and
a swage boss insert comprising a flange and a swage boss extending from the flange through the through-hole of the stiffener;
wherein;
the stiffener is positioned between the flange and the first side of the actuator arm; and
a proximal surface of the flange and a proximal surface of the first suspension both mate with a same distal surface of the stiffener.

9. The HDD of claim 8, wherein:
a distal surface of the flange is a first distance in a distal direction from the distal surface of the stiffener;
a distal surface of the first suspension is a second distance in the distal direction from the distal surface of the stiffener; and
the first distance is greater than the second distance.

10. The HDD of claim 9, wherein the distal surface of the flange is the surface of the flange closest to the first recording disk medium.

11. The HDD of claim 9, wherein a distance between the distal surface of the first suspension and a corresponding recording disk medium is greater than a distance between the distal surface of the flange and the corresponding recording disk medium.

12. The HDD of claim 11, wherein the distance between the distal surface of the first suspension and the corresponding recording disk medium is at an area in which the first suspension is prone to contact the corresponding recording disk medium in response to an operational shock event.

13. The HDD of claim 8, wherein:
the first suspension comprises an electrical trace routed along a long axis and on a trace side of the first suspension; and
the swage boss insert is coupled with the stiffener, via the flange, on the trace side of the first suspension.

14. The HDD of claim 8, further comprising:
a second suspension; and
a second swage plate assembly to which the second suspension is coupled, the second swage plate assembly coupling the second suspension to an opposing second side of the actuator arm and comprising:
a stiffener comprising a through-hole, and
a swage boss insert comprising a flange and a swage boss extending from the flange through the through-hole of the stiffener;
wherein the stiffener of the second swage plate assembly is positioned between the flange of the swage boss insert of the second swage plate assembly and the second side of the actuator arm.

15. A method of assembling a head stack assembly (HSA), the method comprising:
swaging a first suspension to a first side of an actuator arm via a swage boss of a first swage plate assembly;
wherein the first swage plate assembly comprises:
a baseplate comprising a through-hole, and
a swage nut comprising a flange and the swage boss extending from the flange through the through-hole of the baseplate;
wherein:
the baseplate is positioned between the flange and the first side of the actuator arm;
the first suspension comprises an electrical trace routed along a long axis and on a trace side of the first suspension;
the swage nut is coupled with the baseplate on the trace side of the first suspension; and
a proximal surface of the flange and a proximal surface of the first suspension both mate with a same distal surface of the baseplate.

16. The method of claim 15, further comprising:
swaging a second suspension to a second side of the actuator arm via a swage boss of a second swage plate assembly;
wherein the second swage plate assembly comprises:
a baseplate comprising a through-hole, and
a swage nut comprising a flange and the swage boss extending from the flange through the through-hole of the baseplate;
wherein:
the baseplate is positioned between the flange and the second side of the actuator arm;
the second suspension comprises an electrical trace routed along a long axis and on a trace side of the second suspension; and
the swage nut is coupled with the baseplate on the trace side of the second suspension.

17. A system comprising:
means for swaging a first suspension assembly to a first side of an actuator arm via a first swage plate assembly; and
means for swaging a second suspension assembly to a second side of the actuator arm via a second swage plate assembly;
wherein:
a proximal surface of the first swage plate assembly and a proximal surface of the first suspension assembly both mate with a same distal surface of stiffener means of the first swage plate assembly;
a distal surface of the first swage plate assembly is a first distance in a distal direction from the distal surface of the stiffener means;
a distal surface of the first suspension assembly is a second distance in the distal direction from the distal surface of the stiffener means; and
the first distance is greater than the second distance.

18. A head gimbal assembly (HGA) comprising:
a suspension assembly comprising a load beam and a flexure; and
a swage plate assembly coupled with the suspension assembly, the swage plate assembly comprising:
a baseplate comprising a through-hole, and a swage boss insert comprising a flange and a swage boss extending from the flange through the through-hole of the baseplate;
wherein a proximal surface of the flange and a proximal surface of the suspension assembly both mate with a same distal surface of the baseplate.

19. The HGA of claim 18, further comprising:
a head slider housing a read-write transducer and coupled to the suspension assembly.

* * * * *